(12) United States Patent
Kushleyev et al.

(10) Patent No.: US 11,188,075 B2
(45) Date of Patent: Nov. 30, 2021

(54) CONTROLLING A ROBOTIC VEHICLE FOLLOWING FLIGHT CONTROLLER SIGNAL LOSS

(71) Applicant: QUALCOMM Incorporated, San Diego, CA (US)

(72) Inventors: Aleksandr Kushleyev, Philadelphia, PA (US); Daniel Warren Mellinger, III, Philadelphia, PA (US); Paul Daniel Martin, Philadelphia, PA (US); Michael Joshua Shomin, Philadelphia, PA (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 16/053,117

(22) Filed: Aug. 2, 2018

(65) Prior Publication Data
US 2020/0041998 A1 Feb. 6, 2020

(51) Int. Cl.
*G05D 1/00* (2006.01)
*B64C 39/02* (2006.01)
*G05D 1/08* (2006.01)

(52) U.S. Cl.
CPC ......... *G05D 1/0055* (2013.01); *B64C 39/024* (2013.01); *G05D 1/0816* (2013.01);
(Continued)

(58) Field of Classification Search
CPC .. G05D 1/0055; G05D 1/0816; B64C 39/024; B64C 2201/024; B64C 2201/108; B64C 2201/141
See application file for complete search history.

(56) References Cited

U.S. PATENT DOCUMENTS 9,786,188 B2 10/2017 Wilson et al.
9,828,107 B1 * 11/2017 Ruymgaart .......... G05D 1/0077
(Continued)

FOREIGN PATENT DOCUMENTS

WO 2016172251 A1 10/2016

OTHER PUBLICATIONS

International Search Report and Written Opinion—PCT/US2019/041062—ISA/EPO—dated Oct. 7, 2019, 15 pages.
(Continued)

*Primary Examiner* — Navid Ziaeianmehdizadeh
(74) *Attorney, Agent, or Firm* — Michael F. Taveira

(57) ABSTRACT

Various embodiments include devices and methods for controlling a robotic vehicle. Each electronic speed controller (ESC) of the robotic vehicle may receive open loop flight control information from a flight controller or another processing device of the robotic vehicle. In some embodiments, each ESC may store the provided open loop flight control information in a memory. In response to detecting a loss of control signals from the flight controller, each ESC may access the stored open loop flight control information and perform control of a motor associated with each ESC based on the open loop flight control information. The open loop flight control information may be a sequence of motor control instructions to be performed over a period of time, or parameterized information or vehicle state information that enables each ESC to generate a sequence of motor control instructions.

10 Claims, 9 Drawing Sheets

(52) U.S. Cl.
CPC .. *B64C 2201/024* (2013.01); *B64C 2201/108* (2013.01); *B64C 2201/141* (2013.01)

(56) References Cited

U.S. PATENT DOCUMENTS

| | | | |
|---|---|---|---|
| 2012/0091260 A1* | 4/2012 | Callou | A63H 27/12 |
| | | | 244/17.13 |
| 2015/0225081 A1* | 8/2015 | Stabler | B64C 39/024 |
| | | | 701/3 |
| 2016/0055754 A1 | 2/2016 | Ling et al. | |
| 2016/0062364 A1* | 3/2016 | Foinet | A63H 27/14 |
| | | | 701/2 |
| 2016/0264150 A1* | 9/2016 | Freiwald | G05B 9/03 |
| 2016/0311526 A1 | 10/2016 | Geise et al. | |
| 2017/0025971 A1* | 1/2017 | Song | H02P 5/46 |
| 2017/0158338 A1 | 6/2017 | Sweeny et al. | |
| 2018/0191276 A1* | 7/2018 | Ahmed | H02P 6/06 |
| 2019/0384288 A1* | 12/2019 | Gu | B64D 31/12 |

OTHER PUBLICATIONS

Suh J., et al., "A Virtual Closed Loop Remedy for Temporary Sensor Failures," Proceedings of the 1999 IEEE International Conference on Control Applications, Kohala Coast, USA, Aug. 22-27, 1999, vol. 2, pp. 1515-1518, XP010356285, DOI: 10.1109/CCA.1999.801196 ISBN: 978-0-7803-5446-3 the whole document.

* cited by examiner

CONTROLLING A ROBOTIC VEHICLE FOLLOWING FLIGHT CONTROLLER SIGNAL LOSS

BACKGROUND

Robotic vehicles (e.g., "UAVs" or "drones") are typically controlled by a powerful main processor that handles numerous functions of the robotic vehicle, such as flight control and navigation, processing sensor data (e.g., input from cameras, sonar, gyroscope, accelerometer, etc.), receiving and processing GPS signals, controlling radios for communication, and the like.

Rotorcraft-type robotic vehicles (i.e., robotic vehicles propelled by "helicopter" style rotors) are in increasingly wide use. The main processor of rotorcraft robotic vehicles includes a flight controller that handles flight operations, among other things. However, many multi-rotor aerial robotic vehicles are dynamically unstable, and during normal operation such robotic vehicles rely on active control by the main (flight) controller to stabilize and close the loop on attitude, position, and velocity control using a variety of onboard sensors such as accelerometers, gyroscopes, barometers, GPS receivers, magnetometers, and other suitable sensors. In order to achieve closed-loop flight control, using a combination of the sensor data the main processor continuously computes and transmits motor behavior or state information (e.g., power, revolutions per minute (RPM), or other suitable information) to electronic speed controllers (ESCs). The ESCs receive this motor behavior or state information and apply closed-loop motor control techniques to achieve a desired state for each motor, thereby performing the final step in the closed loop flight control.

SUMMARY

Various embodiments include methods that may be implemented within processing devices and electronic speed controller (ESC) of a robotic vehicle to enable open loop control of the robotic vehicle, for example, following loss of control signals from a flight controller. Various embodiments may include receiving, by each ESC of the robotic vehicle, open loop flight control information, and performing, by each ESC, control of a motor associated with each ESC based on the open loop flight control information in response to detecting a loss of control signals from the flight controller. In some embodiments, performing, by each ESC, control of a motor associated with each ESC based on the open loop flight control information may include adjusting, by each ESC, a closed-loop control of the motor associated with the ESC based on the open loop flight control information.

In some embodiments, the open loop flight control information received by each ESC may include a sequence of motor control instructions and performing control of a motor associated with each ESC based on the open loop flight control information may include executing the sequence of motor control instructions.

In some embodiments, the open loop flight control information for each ESC may include a parameterization of a time sequence of motor control instructions, and performing, by each ESC, control of a motor associated with each ESC based on the open loop flight control information may include each ESC determining a sequence of motor control instructions based upon the parameterization of the time sequence of motor control instructions, and executing the sequence of motor control instructions.

In some embodiments, performing open loop flight control of the motor associated with each ESC based on the open loop flight control information may include determining, by each ESC, motor control instructions for the motor associated with the ESC based on the open loop flight control information, and executing, by each ESC, the determined motor control instructions.

In some embodiments, the open loop flight control information received by each ESC may include vehicle state information, and determining motor control instructions for the motor associated with the ESC based on the open loop flight control information may include determining, by each ESC, motor control instructions for executing an appropriate response to a loss of control signals event based on the vehicle state information. Such embodiments may further include periodically receiving, from the flight controller, the vehicle state information by each ESC.

Some embodiments may further include a processing device of the robotic vehicle determining vehicle state information, determining the open loop flight control information for each ESC based on the vehicle state information, and providing the determined open loop flight control information to each ESC. In such embodiments, receiving, by each ESC of the robotic vehicle, open loop flight control information from the flight controller may include each ESC receiving the open loop flight control information from the processing device, and storing the received open loop flight control information in memory accessible by the ESC. In such embodiments, providing the determined open loop flight control information to each ESC may include storing, by the processing device, the determined open loop flight control information in memory that is accessible by each ESC, and receiving, by each ESC, open loop flight control information may include each ESC having access to the memory in which the processing device stores the determined open loop flight control information.

In some embodiments, determining the open loop flight control information for each ESC based on the vehicle state information may include the processing device determining an appropriate response of the robotic vehicle to a loss of control signals event based on the vehicle state information, determining a sequence of motor control instructions for each ESC based on the determined appropriate response, and providing the respective sequence of motor control instructions to each ESC, in which receiving open loop flight control information by each ESC may include receiving the respective sequence of motor control instructions from the processing device. In such embodiments, determining a sequence of motor control instructions for each ESC based on the determined appropriate response may include the processing device performing a forward simulation of robotic vehicle behavior in response to a sequence of ESC instructions beginning from the vehicle state information to determine a sequence of motor control instructions that will bring the robotic vehicle to an orientation that will enable the robotic vehicle to achieve a controlled landing or minimize damage to the robotic vehicle.

Further embodiments include a robotic vehicle having a processing device and one or more ESCs configured to perform operations of any of the methods summarized above. Further embodiments include and ESC configured to perform operations of any of the methods summarized above. Further embodiments include a processing device for use in a robotic vehicle configured to perform operations of any of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Figure 1:
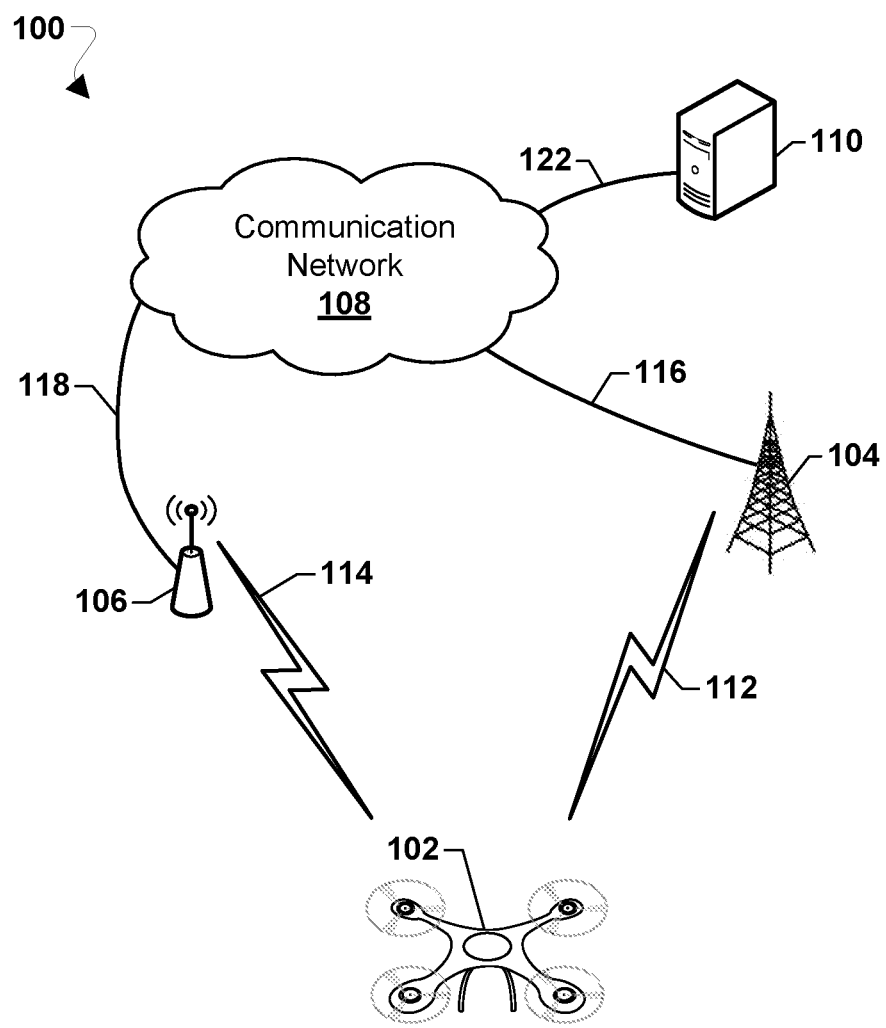
FIG. 1 is a system block diagram of a robotic vehicle operating within a communication system suitable for use with various embodiments.

Various embodiments will be described in detail with reference to the accompanying drawings. Wherever possible, the same reference numbers will be used throughout the drawings to refer to the same or like parts. References made to particular examples and embodiments are for illustrative purposes and are not intended to limit the scope of the claims.

Various embodiments improve the functions and reliability of robotic vehicles by providing methods, and robotic vehicle flight controllers and ESCs configured to perform the methods, of determining a sequence of fail-safe flight control instructions to be performed by the ESCs in the event of flight controller failure. In various embodiments, in response to detecting a loss of control signals from the flight controller, the ESCs may control one or more associated motors using the determined open loop flight control instructions.

The main or flight controller of a robotic vehicle is typically a robust processing device capable of controlling numerous functions of the robotic vehicle, such as flight control and navigation, processing sensor data (e.g., input from cameras, sonar, gyroscope, accelerometer, etc.), receiving and processing GPS signals, controlling radios for communication, and the like. The main or flight controller may include a robust processing device with memory, data interfaces, avionics sensors and processors, and other components configured to monitor and control various components and functionality of the robotic vehicle. The main controller may be implemented as a "system-on-chip" (SOC), which is a set of interconnected electronic circuits within a single package or assembly typically, but not exclusively, including one or more processors, a memory, a communication interface, and a storage memory interface. Robotic vehicles leverage the capabilities of such a main controller by including increasingly complex hardware components and software-based functionality. As the complexity of robotic vehicle components and functionality increases, so does the likelihood of a hardware or software fault that cause a loss of control signals from the main controller.

Many multi-rotor aerial robotic vehicles are dynamically unstable, and during normal operation such robotic vehicles rely on active control by the main (flight) controller to stabilize and close the loop on attitude, position, and velocity control using a variety of onboard sensors such as accelerometers, gyroscopes, barometers, GPS receivers, magnetometers, and other suitable sensors. In some cases, the main or flight controller controls rotor speeds by continuously sending RPM or other control signals to electronic speed controllers (ESC) that power and control the motors that drive the rotors. In order to achieve closed-loop flight control, using a combination of the sensor data, the main or flight controller continuously computes and transmits motor behavior or state information (e.g., power, RPM, or other suitable information) to electronic speed controllers (ESCs). The ESCs receive this motor behavior or state information and apply closed-loop motor control techniques to achieve a desired state for each motor, thereby performing the final step in the closed loop flight control. In the event of a loss of control signals (e.g., due to a processor crash, communication bus failure, etc.) from the main or flight controller, a rotorcraft robotic vehicle may rapidly become unstable. Such instability may lead to loss of controlled flight, erratic maneuvering, and a collision that may injure people or animals, as well as potentially damage the robotic vehicle or other property. Such a loss of control signals may occur for a variety of reasons, including a software issue in the main or flight controller that results in a processor stall or reboot, a failure in the main or flight controller or circuitry that communicates control signals to ESCs, and the like.

Various embodiments provide methods, and ESCs configured to perform the methods of controlling a robotic vehicle when control signals from a flight controller are interrupted. In various embodiments, from time to time each ESC may receive from the flight controller open loop flight control information, which each ESC may store in a memory associated with the ESC. In response to an interruption of control signals from the flight controller, each ESC may independently access the stored open loop flight control information and independently perform control of an associated motor (i.e., without feedback for flight control behavior) based on the open loop flight control information. As open loop flight control of robotic vehicle motors cannot react to changes in vehicle attitude, such open loop flight control by ESCs may be limited to brief maneuvers to position or posture the robotic vehicle for an emergency landing (e.g., a parachute recovery) or temporary control until control signals are again received from the flight controller (e.g., following a reboot). In some embodiments, each ESC may detect a loss of control signals from the flight controller based on a loss of sensor information from sensors of the robotic vehicle.

As used herein, "open loop flight control" means flight control of a robotic vehicle without the use of sensor feedback to achieve a desired closed loop flight control. For example, without information from accelerometers, gyroscopes, and other sensors, the robotic vehicle may attempt to fly "blindly" (i.e., without sensor information) while ESCs still have control of the individual motors and are aware of their state from motor position sensors or sensor-less commutation techniques. "Open loop flight control information" refers to information that enables an ESC to perform open loop flight control of an associated motor, such as motor control in order to achieve non-trivial open loop flight control behavior. One example of trivial open loop flight control is continuing to execute a last known valid motor command. Another example of trivial open loop flight control is simply stopping the motors. Open loop flight control information is distinguishable from the control of individual motors by ESCs, since ESCs receive information from the motors and perform closed-loop control over the motors while implementing the open loop flight control instructions. In some embodiments, in addition to normal communication that is required for flight operations, a flight controller may provide open loop flight control information to one or more ESCs. In some embodiments, r, the one or more ESCs may store the open loop flight control information and use the open loop flight control information to perform closed-loop control over one or more motors of the robotic vehicle in the event of a loss of flight control signals from the flight controller.

In some embodiments, the open loop flight control information may include motor control instructions. In some embodiments, the motor control instructions may include a series of motor speeds (e.g., in RPM) to be applied to the corresponding motor over a period of time (e.g., 1-2 seconds). In some embodiments, the open loop flight control information may include a sequence of motor control instructions over a period of time similar to normal control instructions received from the flight controller. In some embodiments, the open loop flight control information may include a time-parameterized array of ESC commands that have the same format as a real-time ESC control (e.g., in RPM). For example, the flight controller may pre-determine motor control instructions appropriate for each ESC for responding to a loss of control signals event given the robotic vehicle's current attitude, speed and altitude, and send the pre-determined motor control instructions to each ESC (e.g., to a processor of each ESC) for storage in a local memory. The flight controller may determine the motor control instructions for each ESC by determining an appropriate vehicle response a loss of control signals event based on state information of the robotic vehicle, such as an altitude, pitch, velocity, current motor RPMs, and/or other similar state information, and pre-calculating the sequence of motor control instructions that when executed independently by ESCs will result in the robotic vehicle executing that response.

In some embodiments, the open loop flight control information for each ESC may formatted as a parameterization of a time sequence of motor control instructions. For example, the flight controller may compress a sequence of motor control instructions, such as by determining a sequence of polynomials that may be used to parameterize the motor control instructions, and by sending to each ESC coefficients of polynomials rather than sending a complete array of motor control instructions.

In some embodiments, each ESC may store the determined motor control instructions in a memory, and in the event of loss of flight controller signals, each ESC may retrieve the motor control instructions and control its associated motor.

In some embodiments, the open loop flight control information provided by the flight controller to each ESC may include state information about the robotic vehicle that enables each ESC to determine on its own an appropriate series of motor controls to execute a suitable response to a loss of control signals event. Such state information may include, for example, the vehicle's attitude (e.g., pitch, roll and yaw angles), velocity, altitude, current motor RPMs, and/or other similar state information. Each ESC may store the received state information, and in response to detecting a loss of flight controller signals, each ESC may retrieve the state information and use the state information to generate motor control signals to establish control of its associated motor. In some embodiments, the open loop flight control information may enable each ESC to generate motor control instructions for a relatively short period of time (e.g., for one or more seconds).

In some embodiments, the flight controller (or the ESC controller) may determine the motor control instructions to follow a predetermined fail-safe trajectory, place the robotic vehicle in a particular fail-safe state, or to perform a particular fail-safe action. For example, the flight controller (or the ESC controller) may determine the motor control instructions that will bring the robotic vehicle to a level flight attitude, and then turn off the motors. As another example, the flight controller (or the ESC controller) may determine the motor control instructions to reduce a speed of the robotic vehicle and/or level off at a specified altitude. As another example, the flight controller (or the ESC controller) may determine the motor control instructions to ascend to a specified altitude (if appropriate), stop the motors, and deploy a parachute. As another example, the flight controller (or the ESC controller) may determine the motor control instructions to stop the motors in such a manner that the propellers are detached from the motor (e.g., by being unscrewed), and deploy a parachute. Other forms of maneuvers in in the event of loss of flight controller signals are possible implementing various embodiments.

Various embodiments may be implemented within a robotic vehicle operating within a variety of communication systems 100, an example of which is illustrated in FIG. 1. With reference to FIG. 1, the communication system 100 may include a robotic vehicle 102, a base station 104, an access point 106, a communication network 108, and a network element 110.

The base station 104 and the access point 106 may provide wireless communications to access the communication network 108 over a wired and/or wireless communication backhaul 116 and 118, respectively. The base station 104 may include base stations configured to provide wireless communications over a wide area (e.g., macro cells), as well as small cells, which may include a micro cell, a femto cell, a pico cell, and other similar network access points. The access point 106 may be configured to provide wireless communications over a relatively smaller area. Other examples of base stations and access points are also possible.

The robotic vehicle 102 may communicate with the base station 104 over a wireless communication link 112 and with the access point 106 over a wireless communication link 114. The wireless communication links 112 and 114 may include a plurality of carrier signals, frequencies, or frequency bands, each of which may include a plurality of logical channels. The wireless communication links 112 and 114 may utilize one or more radio access technologies (RATs). Examples of RATs that may be used in a wireless communication link include 3GPP Long Term Evolution (LTE), 3G, 4G, 5G, Global System for Mobility (GSM), Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short-range RATs such as ZigBee, Bluetooth, and Bluetooth Low Energy (LE).

The network element 110 may include a network server or another similar network element. The network element 110 may communicate with the communication network 108 over a communication link 122. The robotic vehicle 102 and the network element 110 may communicate via the communication network 108. The network element 110 may provide the robotic vehicle 102 with a variety of information, such as navigation information, weather information, information about environmental conditions, movement control instructions, and other information, instructions, or commands relevant to operations of the robotic vehicle 102.

Figure 2:
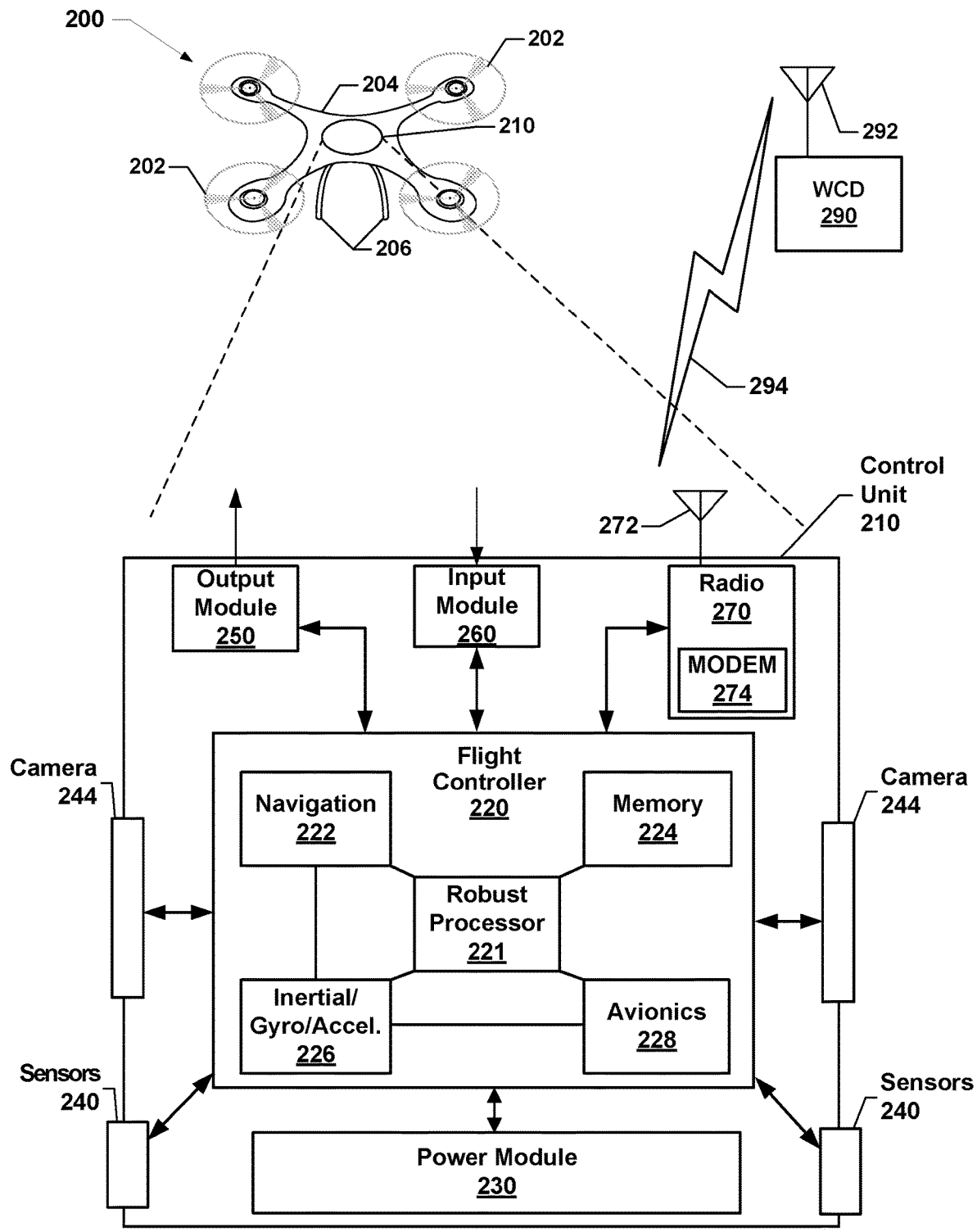
FIG. 2 is a component block diagram illustrating components of a robotic vehicle suitable for use with various embodiments.

In various embodiments, a robotic vehicle may include winged or rotorcraft varieties of aerial robotic vehicles. FIG. 2 illustrates an example of an aerial robotic vehicle 200 that utilizes multiple rotors 202 driven by corresponding motors to provide lift-off (or take-off) as well as other aerial movements (e.g., forward progression, ascension, descending, lateral movements, tilting, rotating, etc.). The robotic vehicle 200 is illustrated as an example of a robotic vehicle that may utilize various embodiments, but is not intended to imply or require that various embodiments are limited to aerial robotic vehicles or rotorcraft robotic vehicles. Various embodiments may be used with winged robotic vehicles, land-based autonomous vehicles, and water-borne autonomous vehicles that utilize ESCs.

With reference to FIGS. 1 and 2, the robotic vehicle 200 may be similar to the robotic vehicle 102. The robotic vehicle 200 may include a number of rotors 202, a frame 204, and landing columns 206 or skids. The frame 204 may provide structural support for the motors associated with the rotors 202. The landing columns 206 may support the maximum load weight for the combination of the components of the robotic vehicle 200 and, in some cases, a payload. For ease of description and illustration, some detailed aspects of the robotic vehicle 200 are omitted such as wiring, frame structure interconnects, or other features that would be known to one of skill in the art. For example, while the robotic vehicle 200 is shown and described as having a frame 204 having a number of support members or frame structures, the robotic vehicle 200 may be constructed using a molded frame in which support is obtained through the molded structure. While the illustrated robotic vehicle 200 has four rotors 202, this is merely exemplary and various embodiments may include more or fewer than four rotors 202.

The robotic vehicle 200 may further include a control unit 210 that may house various circuits and devices used to power and control the operation of the robotic vehicle 200. The control unit 210 may include a flight controller 220, a power module 230, sensors 240, one or more cameras 244, an output module 250, an input module 260, and a radio 270.

The flight controller 220 may include a processing device 221 configured with processor-executable instructions to control maneuvering and other operations of the robotic vehicle 200. The processing device 221 may be a multi-core processor or multi-processor assembly. The flight controller 220 may also include (e.g., as an SOC) or be coupled to a navigation unit 222, a memory 224, an inertial sensor/gyro/accelerometer unit 226 (which may include an accelerometer, a gyroscope, a magnetometer, an inertial measurement unit, and other similar components), and an avionics module 228, all coupled to the processing device 221. The flight controller 220 and/or the navigation unit 222 may be configured to communicate with a server through a wireless connection (e.g., a cellular data network) to receive data useful in navigation, provide real-time position reports, and assess data.

The avionics module 228 may be coupled to the processing device 22 land/or the navigation unit 222, and may be configured to provide maneuvering control-related information such as altitude, attitude, airspeed, heading, and similar information that the navigation unit 222 may use for navigation purposes, such as dead reckoning between Global Navigation Satellite System (GNSS) position updates. The gyro/accelerometer unit 226 may include an accelerometer, a gyroscope, an inertial sensor, or other similar sensors. The avionics module 228 may include or receive data from the gyro/accelerometer unit 226 that provides data regarding the orientation and accelerations of the robotic vehicle 200 that may be used in navigation and positioning calculations, as well as providing data used in various embodiments for processing images.

The flight controller 220 may further receive additional information from the sensors 240, such as an image sensor or optical sensor (e.g., a sensor capable of sensing visible light, infrared, ultraviolet, and/or other wavelengths of light). The sensors 240 may also include a radio frequency (RF) sensor, a barometer, a humidity sensor, a sonar emitter/detector, a radar emitter/detector, a microphone or another acoustic sensor, a lidar sensor, a time-of-flight (TOF) 3-D camera, or another sensor that may provide information usable by the flight controller 220 for movement operations, navigation and positioning calculations, and determining environmental conditions. The sensors 240 may also include one or more sensors configured to detect temperatures generated by one or more components of the robotic vehicle, such as thermometers, thermistors, thermocouples, positive temperature coefficient sensors, and other sensor components.

The power module 230 may provide power to various components, including the flight controller 220, the sensors 240, the one or more cameras 244, the output module 250, the input module 260, and the radio 270. In addition, the power module 230 may include energy storage components, such as rechargeable batteries. The flight controller 220 may be configured with processor-executable instructions to control the charging of the power module 230 (i.e., the storage of harvested energy), such as by executing a charging control algorithm using a charge control circuit. Alternatively or additionally, the power module 230 may be configured to manage its own charging. The flight controller 220 may be coupled to the output module 250, which may output control signals for managing the motors that drive the rotors 202 and other components.

The robotic vehicle 200 may be controlled through control of the individual motors of the rotors 202 as the robotic vehicle 200 progresses toward a destination. The flight controller 220 may receive data from the navigation unit 222 and use such data in order to determine the present position and orientation of the robotic vehicle 200, as well as the appropriate course towards the destination or intermediate sites. In various embodiments, the navigation unit 222 may include a GNSS receiver system (e.g., one or more global positioning system (GPS) receivers) enabling the robotic vehicle 200 to navigate using GNSS signals. Alternatively or in addition, the navigation unit 222 may be equipped with radio navigation receivers for receiving navigation beacons or other signals from radio nodes, such as navigation beacons (e.g., very high frequency (VHF) omni-directional range (VOR) beacons), Wi-Fi access points, cellular network sites, radio station, remote computing devices, other robotic vehicles, etc.

The radio 270 may be configured to receive navigation signals, such as signals from aviation navigation facilities, etc., and provide such signals to the processing device 221 and/or the navigation unit 222 to assist in robotic vehicle navigation. In various embodiments, the navigation unit 222 may use signals received from recognizable RF emitters (e.g., AM/FM radio stations, Wi-Fi access points, and cellular network base stations) on the ground.

The navigation unit 222 may include a planning application that may perform calculations to plan a path of travel for the robotic vehicle within a volumetric space ("path planning"). In some embodiments, the planning application may perform path planning using information including information about aspects of a task to be performed by the robotic vehicle, information about environmental conditions, an amount of heat that may be generated by one or more components of the robotic vehicle in performing the task, as well as one or more thermal constraints.

The radio 270 may include a modem 274 and a transmit/receive antenna 272. The radio 270 may be configured to conduct wireless communications with a variety of wireless communication devices (e.g., a wireless communication device (WCD) 290), examples of which include a wireless telephony base station or cell tower (e.g., the base station 104), a network access point (e.g., the access point 106), a beacon, a smartphone, a tablet, or another computing device with which the robotic vehicle 200 may communicate (such as the network element 110). The flight controller 220 may establish a bi-directional wireless communication link 294 via the modem 274 and the antenna 272 of the radio 270 and the wireless communication device 290 via a transmit/receive antenna 292. In some embodiments, the radio 270 may be configured to support multiple connections with different wireless communication devices using different radio access technologies.

In various embodiments, the wireless communication device 290 may be connected to a server through intermediate access points. In an example, the wireless communication device 290 may be a server of a robotic vehicle operator, a third-party service (e.g., package delivery, billing, etc.), or a site communication access point. The robotic vehicle 200 may communicate with a server through one or more intermediate communication links, such as a wireless telephony network that is coupled to a wide area network (e.g., the Internet) or other communication devices. In some embodiments, the robotic vehicle 200 may include and employ other forms of radio communication, such as mesh connections with other robotic vehicles or connections to other information sources (e.g., balloons or other stations for collecting and/or distributing weather or other data harvesting information).

In various embodiments, the control unit 210 may be equipped with an input module 260, which may be used for a variety of applications. For example, the input module 260 may receive images or data from an onboard camera 244 or sensor, or may receive electronic signals from other components (e.g., a payload).

While various components of the control unit 210 are illustrated as separate components, some or all of the components (e.g., the flight controller 220, the output module 250, the radio 270, and other units) may be integrated together in a single device, circuit board or module, such as an SOC.

Figure 3:
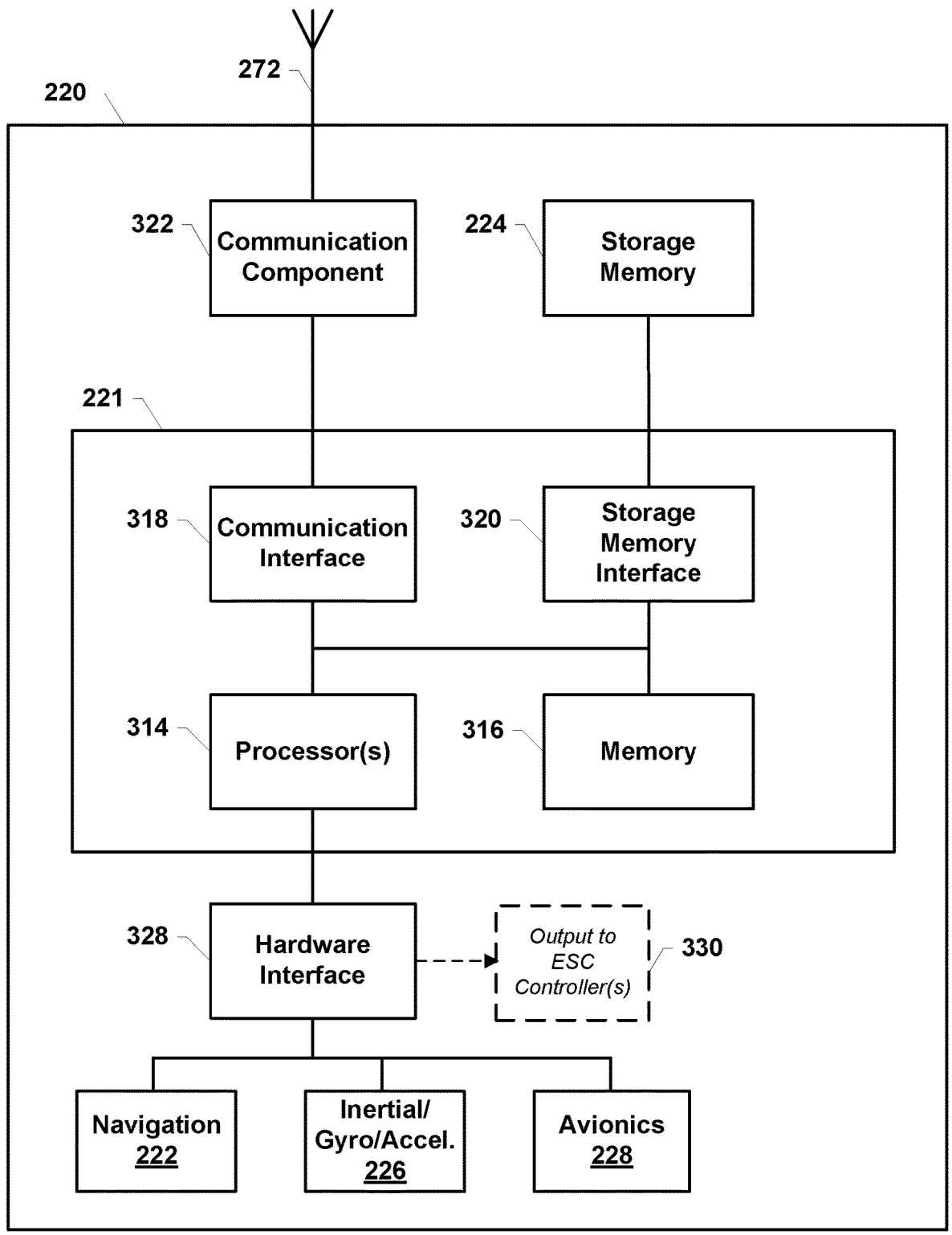
FIG. 3 is a component block diagram illustrating components of a controller suitable for use with robotic vehicles.

FIG. 3 illustrates further components within a robotic vehicle flight controller 220 integrated as an SOC. With reference to FIGS. 1-3, a processing device 221 within the flight controller 220 may include a one or more processors or processor cores 314, a working memory 316, a communication interface 318, and a storage memory interface 320. The storage memory interface 320 may be configured to enable the processors 314 to store data to and retrieve data from a storage memory 224, which may be integrated within the flight controller 220 SOC as illustrated or connected as a separate component. The flight controller 220 configured as an SOC may include a communication component 322, which may integrate a radio 270 with a wireless modem 274, that is configured to connect to an antenna 272 for establishing a wireless communication link, and/or the like.

The flight controller 220 integrated as an SOC may further include a hardware interface 328 configured to enable the processing device 221 to interface with the navigation module 222, inertial sensor/gyroscope/accelerometer module 226, and avionics module 228, as well as communicate with and control various components of a robotic vehicle. In some embodiments, the hardware interface 328 may also provide an output 330 to one or more ESCs to provide open loop flight control information to the ESCs, as further described below.

The processing device 221 may include a variety of different types of processors 314 and processor cores, such as a general purpose processor, a central processing unit (CPU), a digital signal processor (DSP), a graphics processing unit (GPU), an accelerated processing unit (APU), a subsystem processor of specific components of the processing device, such as an image processor for a camera subsystem or a display processor for a display, an auxiliary processor, a single-core processor, and a multicore processor. The processing device 221 may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

The flight controller 220 may include more than one processing device 221, thereby increasing the number of processors 314 and processor cores within the flight controller 220. The flight controller 220 may also include other processors (not shown) that are not within the processing device 221. The one or more processors 314 may each be configured for specific purposes that may be the same as or different from other processors 314 of the processing device 221 or flight controller 220 SOC. One or more of the processors 314 and processor cores of the same or different configurations may be grouped together.

The working memory 316 of the processing device 221 may be a volatile or non-volatile memory configured for storing data and processor-executable instructions for access by the processor 314. The flight controller 220 and/or processing device 221 may include one or more storage memories 224 configured to store data for various purposes, including mission-related data (e.g., video data, navigation maps, mission planning, etc.). The working memory 316 may include volatile memories such as random access memory (RAM) or main memory, and cache memory.

Some or all of the components of the flight controller 220 and the processing device 221 may be arranged differently and/or combined while still serving the functions of the various aspects. The flight controller 220 and the processing device 221 may not be limited to one of each of the components, and multiple instances of each component may be included in various configurations. Further, another processing device (similar to 221) may be included within or coupled to the flight controller 220 and configured to perform some or all of the operations of various embodiments associated with providing open loop flight control information to ESCs. For ease of reference, the term "processing device" is used generally to refer to either the flight controller, a processor within the flight controller, or a separate processing device within the robotic vehicle configured to perform operations of various embodiments.

Figure 4:
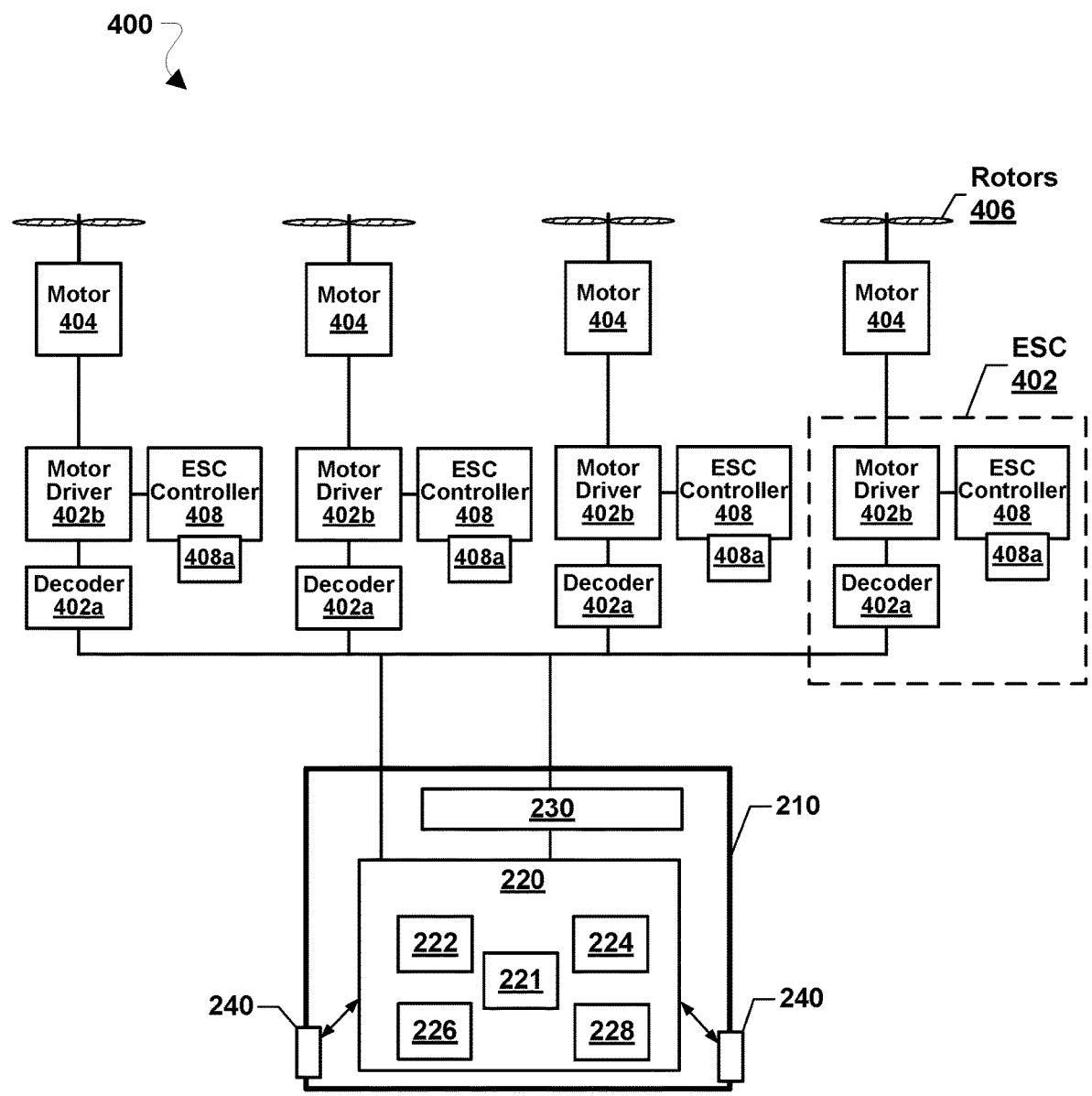
FIG. 4 is a component block diagram illustrating components of a robotic vehicle suitable for use with various embodiments.

FIG. 4 is a component block diagram illustrating components of a robotic vehicle 400 suitable for use with various embodiments. With reference to FIGS. 1-4, the robotic vehicle 400 may be similar to the robotic vehicles 102, 200. The robotic vehicle 400 is illustrated as an example of a robotic vehicle, but is not intended to imply or require that various embodiments are limited to aerial robotic vehicles or rotorcraft robotic vehicles. Various embodiments may be used with winged robotic vehicles, land-based autonomous vehicles, and water-borne autonomous vehicles.

The robotic vehicle 400 may include one or more electronic speed controllers (ESCs) 402 coupled to the control unit 210. The ESC 402 may handle functions including controlling aspects of the operation of each of the rotors 406 by way of the corresponding motors 404. The ESC 402 may be coupled to the power module 230. The power module 230 (e.g., an onboard battery) may be coupled to the motors 404 (e.g., via the ESC 402) and the flight controller 220. Each motor 404 may be associated with a respective motor driver 402*b* and a decoder 402*a*. Each decoder 402*a* may decode signals, such as control signals, from the flight controller 220 directed to a corresponding motor driver 402*b*.

In normal operation, the flight controller 220 may send control signals to the ESC 402 for controlling power to the motors 404 that drive each of the rotors 406. The flight controller 220 may individually control speeds of each motor 404 via the control signals sent to each ESC 402. The flight controller 220 may drive the motors 404 "forward" at differing rotation rates to generate varying amounts of auxiliary thrust, or "backward" to produce varying amounts of mixed aerodynamic forces. By controlling the speeds of individual motors 404 corresponding to each of the rotors 406, the flight controller 220 may maintain controlled flight as the robotic vehicle 400 progresses toward a destination and/or operates in various flight modes.

The flight controller 220 is typically a robust processing device capable of controlling numerous functions of the robotic vehicle, such as control of the motors 404 via the ESC 402, as well as other operations including flight control, processing sensor data, receiving and processing GPS signals, controlling radios for communication, and the like. As noted above, the consequences of a flight controller failure or reboot during flight operations of an aerial robotic vehicle can be catastrophic because the flight controller 220 will stop signaling the ESC 402, causing the ESCs to stop powering the motors 404. In some embodiments, the loss of control signals from the flight controller 220 may include a loss of signals from one or more of the navigation unit 222, the internal sensor/gyro/accelerometer unit 226, and/or the avionics module 228.

Each ESC 402 may include an ESC controller 408, which may be coupled to a corresponding memory 408*a*. The ESC controller 408 may be configured to receive open loop flight control information from the flight controller 220 or another processing device from time to time (e.g., via the output 330). The ESC controller 408 may store the received open loop flight control information in the memory 408*a*. In various embodiments, in response to detecting that control signals from the flight controller 220 have been lost, the ESC controller 408 may be configured to take control of the ESC 402 (i.e., begin issuing motor control signals to the ESC 402). In such embodiments, the ESC controller 408 may retrieve the stored open loop flight control information from the memory 408*a* and may issue motor control instructions to the motor 404 via the ESC 402. As described, in some embodiments the ESC controller 408 may issue motor control instructions to the motor 404 according to a stored sequence of instructions previously received from the flight controller 220 or another processing device. In some embodiments, the ESC controller 408 may use attitude information received from the flight controller 220 or another processing device to generate and issue a sequence of motor control instructions to the motor 404.

Figure 5:
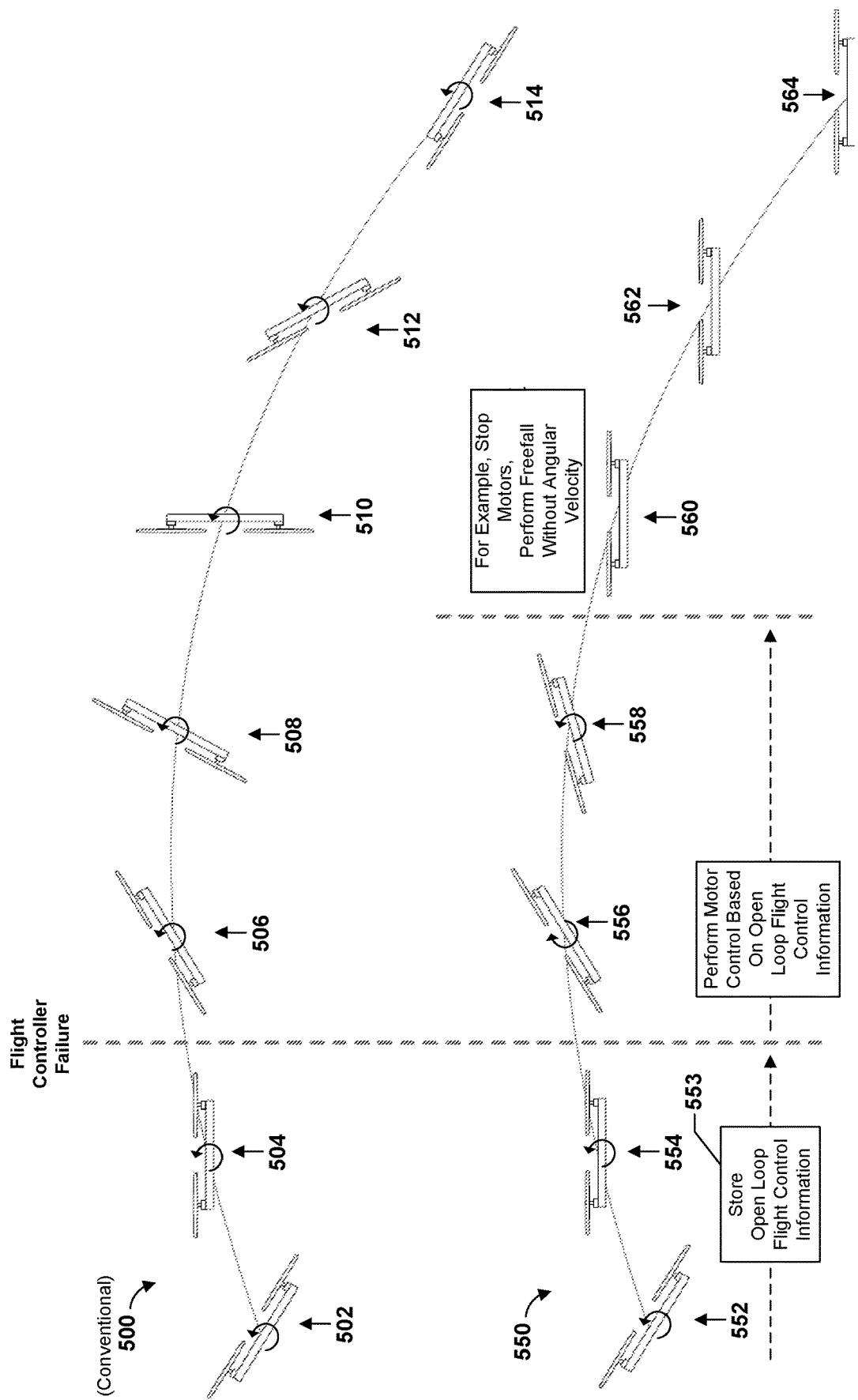
FIG. 5 is a diagram illustrating vehicle trajectories according to various embodiments.

FIG. 5 is a diagram illustrating examples of vehicle trajectories following a loss of control signals from a flight controller, showing a trajectory 500 of a conventional robotic vehicle and a trajectory 550 of a robotic vehicle implementing various embodiments. With reference to FIGS. 1-5, a robotic vehicle (e.g., 102, 200, 400) under control of a flight controller 210 may be in a dynamic state (e.g., shifting from one orientation to another) at any given instant.

FIG. 5 illustrates both a conventional robotic vehicle (trajectory 500) and a robotic vehicle implementing various embodiments (trajectory 550) executing the same roll maneuver prior to a failure of the flight controller. Thus, in the illustrated examples the conventional robotic vehicle at state 502 and the robotic vehicle implementing various embodiments at state 552 are in a non-level state with the flight controller providing active flight control directing the ESCs to control flight motors to induce a counter clockwise rotation about the pitch axis (indicated by the curved arrows).

The pitch up commanded by the flight controller at states 502 and 552 results in the robotic vehicles reaching a state 504, 554 in which the vehicle is approaching a level orientation but still rotating about the pitch axis just prior to the flight control failure.

Referring to the trajectory 500 of a conventional robotic vehicle, in the event of a failure of the flight controller (indicated by the dashed line), the ESCs of the robotic vehicle may continue to execute the same motor controls that were generated in response to control signals from the flight controller just prior to the failure. In the illustrated example, such motor controls caused the robotic vehicle to rotate about the pitch axis from state 502 to the state 504. Thus, the result of the ESCs continuing to execute the same motor controls will cause the robotic vehicle to continue rotating about the pitch axis through states 506, 508, 510, 512, and 514, resulting in a loss of controlled flight.

Referring to the trajectory 550 of a robotic vehicle implementing various embodiments, the flight controller may periodically generate a set of open loop flight control information 553 to be executed in the event of a loss of flight control signals (e.g., may occur upon failure, reboot, or pause of the flight controller). Thus, in addition to sending the control signals to the ESCs that induced the rotation about the pitch axis from state 552 to state 554, the flight controller may provide open loop flight control information to the ESCs for storage in a local memory (or may store the information in a memory accessed by ESCs), and the ESCs may be configured to access and implement the stored open loop flight control information if control signals from the flight controller are lost.

In the event of a flight controller failure, each ESC may access the stored open loop flight control information and control one or more flight motors based on the open loop flight control information without information from accelerometers, gyroscopes, and other sensors. For example, in state 556 just after the flight controller failure, the ESCs may obtain from memory the stored open loop flight control information and begin controlling the associated motor(s) to counter the rotation about the pitch axis that existed in state 554 and reorient the robotic vehicle towards level flight in state 558. In addition to countering the pitch-axis motion that existed in state 554 by inducing a counter rotational force about the pitch axis in state 556, the stored open loop flight control information may include instructions for the ESCs to control the associated motor(s) to substantially cancel or reduce the angular velocity of the robotic vehicle about the pitch axis induced in state 556. Thus, in state 558 just prior to achieving level flight, the stored open loop flight control information may include instructions for the ESCs to control the associated motor(s) to briefly induce a counter rotational force about the pitch axis so that the robotic vehicle is stable upon achieving level flight in state 560.

The stored open loop flight control information may further include instructions for the ESCs to control the associated motor(s) to reduce lift (or stop) in a balanced manner (e.g., with equal velocity to avoid inducing pitch or roll) so that the robotic vehicle can descend through state 562 to a landing in state 564. In some embodiments, the ESCs may subsequently perform a failsafe operation, such as stopping the motors upon reaching a stable (e.g., flat) orientation in state 560 as illustrated, enabling a freefall with little or no angular velocity in states 562 and 564. By the flight controller generating such open loop flight control information, a robotic vehicle 550 is able to achieve a controlled flight state upon failure of the flight controller that may reduce, minimize or eliminate damage upon landing or impact (state 564), especially in contrast to the uncontrolled flight of a conventional robotic vehicle illustrated in state 514.

In various embodiments, the flight controller may determine the open loop flight control information to place the robotic vehicle into a desired state. The desired state may vary depending on the initial state information of the robotic vehicle (i.e., the state of the vehicle at the time the open loop flight control information is generated). In some embodiments, the flight controller may generate and provide the open loop flight control information and provide the determined open loop flight control information to the one or more ESCs while providing normal flight control signals or instructions. In some embodiments, the flight controller may determine future motor control instructions at one or more of a plurality of time steps (e.g., into the future).

In various embodiments, the flight controller may generate the open loop flight control information in a variety of ways. In some embodiments, the flight controller may use a mathematical model of the robotic vehicle to project or predict the motion of the robotic vehicle some period of time into the future (e.g., a period of milliseconds or seconds) based on a current known state of the vehicle (e.g., position, orientation, linear velocity, and pitch/roll/yaw angular velocities), and generate suitable flight control instructions to be executed by the ESCs during the projected time into the future to achieve a desired flight orientation (e.g., flat or stable flight) in view of the projected motions.

In some embodiments, the flight controller may use a mathematical model of the robotic vehicle to perform a forward simulation of vehicle dynamics of the robotic vehicle executing a sequence of ESC instructions beginning from the current vehicle state including simulation of the vehicle's response to stored flight control information. In some embodiments, the flight controller may perform a forward simulation of robotic vehicle behavior in response to a sequence of ESC instructions beginning from the current state to determine a sequence of motor control instructions that will result in a sequence of predicted next vehicle states to bring the robotic vehicle to the desired state.

In some embodiments, the flight controller may use the same flight control algorithm(s) for providing normal flight operation signals or commands to the ESCs and to determine the open loop flight control information. In some embodiments, the flight controller may use the simulated vehicle state information from the forward simulation in combination with one or more flight control algorithm(s) to determine the open loop flight control information. In some embodiments, after completion of the forward simulation, the flight controller may determine the open loop flight control information and provide the determined open loop flight control information to the one or more ESCs.

In some embodiments, the flight controller may determine the open loop flight control information without performing an explicit discrete simulation of vehicle dynamics and control. For example, the flight controller may determine polynomial-form solutions for controlling ESC that are time-parameterized, which are substantially faster to compute and may be represented in more compact form. Such time-parameterized open loop flight control information may be more efficient to determine or generate and more efficient to transmit to the one or more ESCs than open loop flight control information determined based on forward simulations.

Figure 6:
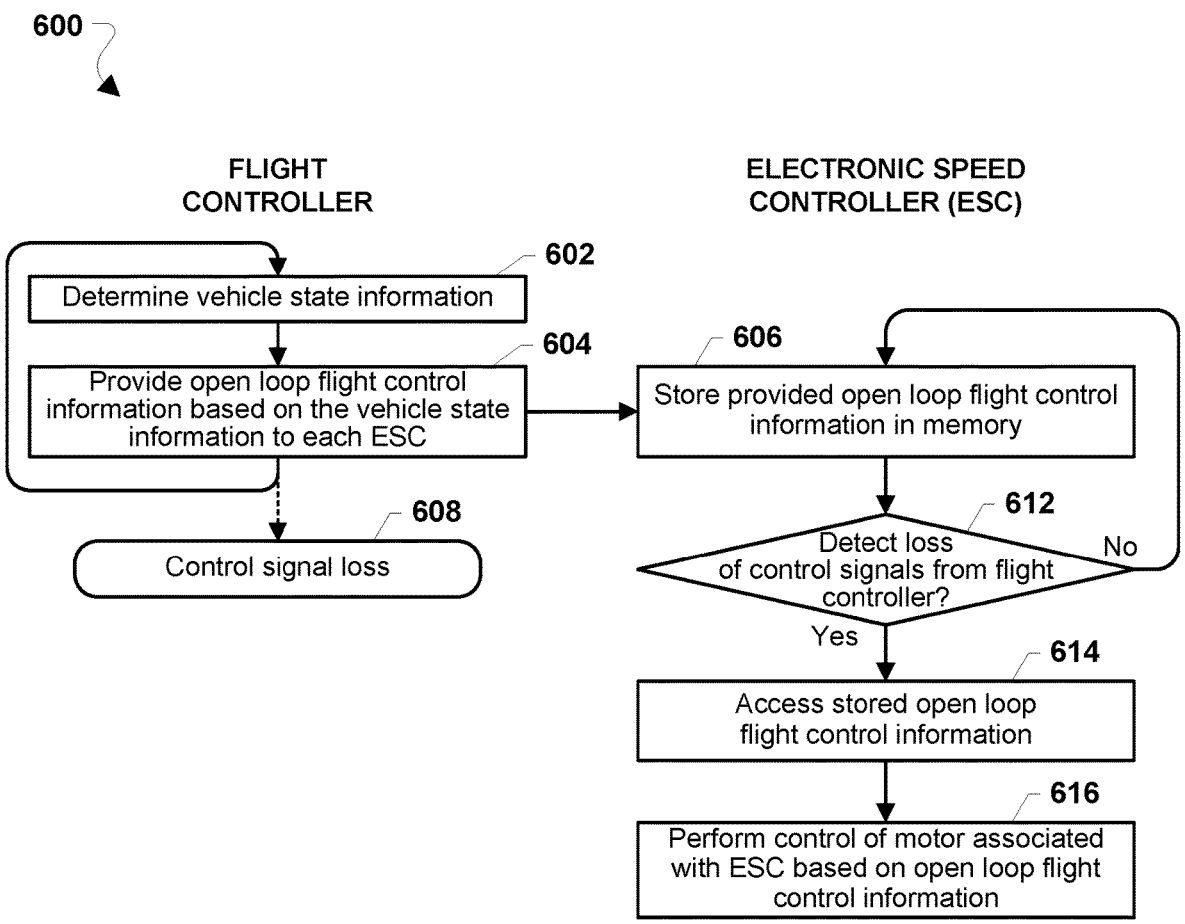
FIG. 6 is a process flow diagram illustrating a method of controlling a robotic vehicle according to various embodiments.

FIG. 6 illustrates a method 600 of controlling a robotic vehicle according to various embodiments. With reference to FIGS. 1-6, the method 600 may be implemented in hardware components and/or software components of the robotic vehicle (e.g., 102, 200, 400), the operation of which may be controlled a flight controller (e.g., 220) or another processing device and ESC controllers (e.g., 408 and/or the like) of the robotic vehicle.

In block 602, the flight controller or another processing device may determine state information of the vehicle. For example, the flight controller may determine one or more of an altitude, pitch, velocity, current motor RPMs, and/or other similar state information as part of normal flight control operations. As another example, another processing device may access flight control information within memory of the flight controller or from attitude sensors (e.g., accelerometers and gyroscopes).

In block 604, the flight controller or another processing device may provide open loop flight control information to the ESC controller (e.g., the ESC controller 408). The open loop flight control information may enable the ESC controller to control an associated motor. For example, the open loop flight control information may be a sequence (or parameterized sequence) of motor control instructions that can be performed by each ESC in response to a loss of control signals. As another example, the flight controller or another processing device may determine attitude information that is suitable for use by an ESC controller for generating motor controls in response to a loss of control signals from the flight controller.

In block 606, the ESC may store the provided open loop flight control information in a memory (e.g., the memory 408a).

The operations in blocks 602-604 may be performed periodically in parallel with the normal control of ESCs by the flight controller. Thus, while not illustrated in FIG. 6, the flight controller may transmit to each ESC motor control signals for maintaining controlled flight until some event (e.g., a processor reboot) causes a loss of control signals from the flight controller in block 608.

In determination block 612, the ESC controller may determine whether a loss of control signals from the flight controller is detected.

In response to determining that a loss of control signals from the flight controller is not detected (i.e., determination block 612="No"), the ESC controller may continue to store open loop flight control information received from by the flight controller or another processing device. In some embodiments, each set of received open loop flight control information may be stored in memory to replace (e.g., over-write) the previously stored set of such information.

In response to determining that a loss of control signals from the flight controller is detected (i.e., determination block 612="Yes"), the ESC controller may access the stored open loop flight control information in block 614.

In block 616, the ESC controller may control a motor or motors associated with the ESC based on the open loop flight control information. In some embodiments, the ESC controller may adjust a closed-loop control of the motor or motors associated with the ESC based on the open loop flight control information.

Figure 7:
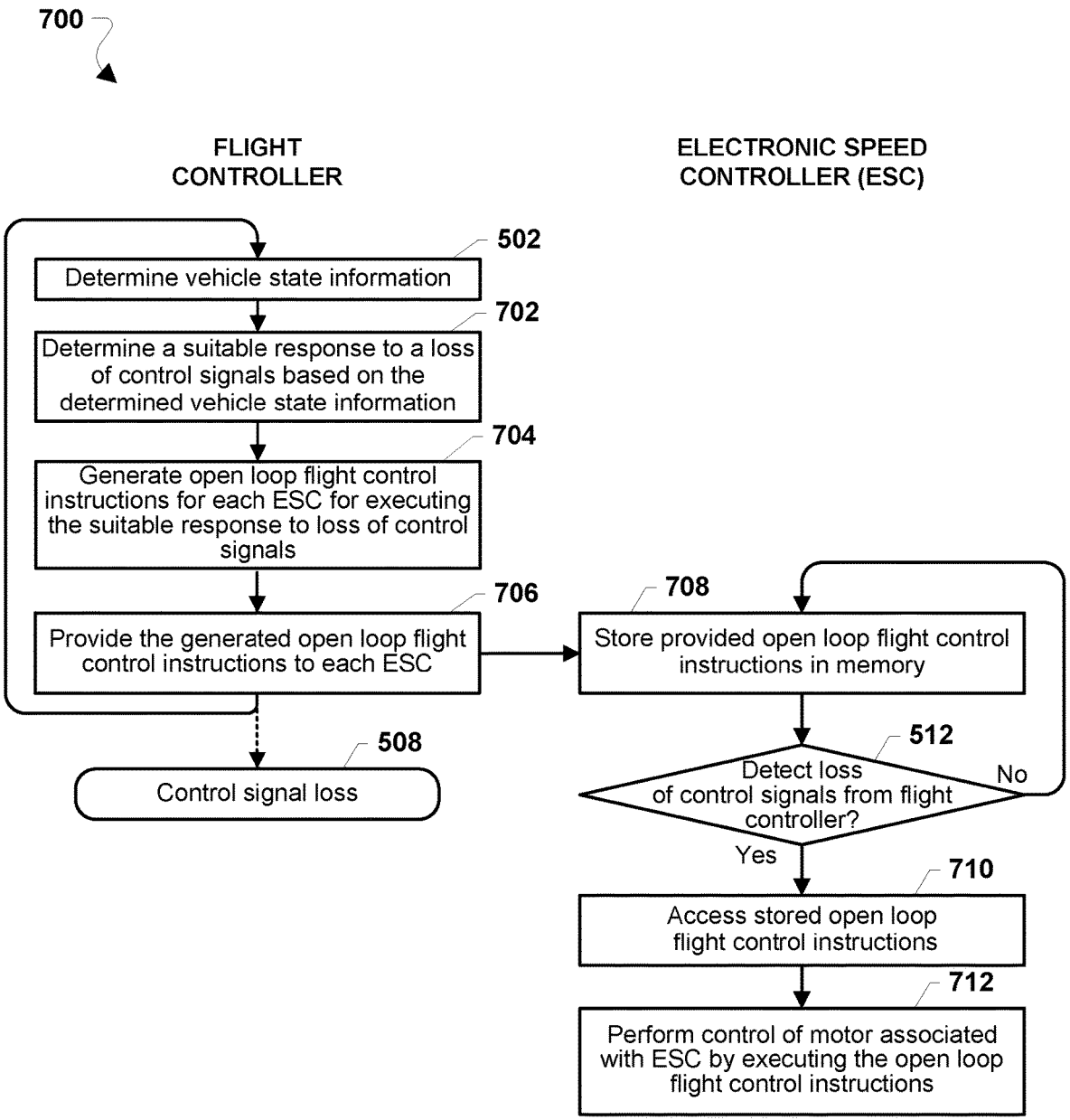
FIG. 7 is a process flow diagram illustrating a method of controlling a robotic vehicle according to some embodiments.

FIG. 7 illustrates a method 700 of controlling a robotic vehicle according to some embodiments. With reference to FIGS. 1-7, the method 700 may be implemented in hardware components and/or software components of the robotic vehicle (e.g., 102, 200, 400), the operation of which may be controlled by a flight controller (e.g., 220) or another processing device and ESC controllers (e.g., 408 and/or the like) of the robotic vehicle. In blocks 502, 508, and 512 the flight controller or another processing device and the ESC controller, respectively, may perform operations of like-numbered blocks of the method 500 as described.

In block 702, the flight controller or another processing device may determine a suitable robotic vehicle response to a loss of control signals event based upon the determined vehicle state information. The appropriate response may be a response that minimizes risk to other objects and people and/or minimizes damage to the robotic vehicle. For example, if the vehicle state information indicates that the robotic vehicle is moving at a high speed, the suitable response may be to slow down or stop before the motors are turned off in order to avoid crashing into people or objects. As another example, if the vehicle state information indicates that the robotic vehicle is in an unstable attitude, the suitable response may be to level the vehicle before the motors are turned off to enable a more controlled decent to the ground. As another example, if the vehicle state information indicates that the robotic vehicle is close to the ground, the suitable response may be to level the vehicle and descend to a soft landing before the motors are turned off. As another example, if the vehicle state information indicates that the robotic vehicle is too high to land before motors stop but too low for a parachute deployment, the suitable response may be to climb to a higher altitude before the motors are turned off and a parachute deployed to enable a soft landing. A variety of suitable responses may be determined based on the current vehicle attitude information, and the suitable response to a loss of control signals event in one instant may not be appropriate a few seconds later when the attitude, speed and altitude of the robotic vehicle has changed. In some embodiments, the flight controller or another processing device may also consider other information, such as camera images and terrain maps, when determining the suitable response to a loss of control signals event so as to avoid crashing into humans, animals and other objects.

In block 704, the flight controller or another processing device may generate motor control instructions for each ESC that will cause the robotic vehicle to perform the determined suitable response to a loss of control signals event when executed by the ESCs in an open loop manner. For example, the motor control instructions may include the motor speed (e.g., in RPM) to be achieved at various time instances following the loss of control signals. In some embodiments, the open loop flight control information for each ESC may include a parameterization of a time sequence of motor control instructions. For example, the flight controller or another processing device may compress a sequence of motor control instructions, such as by determining a sequence of polynomials that may be used to parameterize the motor control instructions, and by sending to each ESC coefficients of polynomials rather than sending a complete array of motor control instructions. In some embodiments, the open loop flight control information may include a sufficient number of motor control instructions for a relatively short period of time (e.g., a period of one or more seconds).

In block 706, the flight controller or another processing device may provide the generated open loop flight control instructions to each ESC. This operation may be performed periodically in parallel with transmission of normal control signals to each ESC.

In block 708, each ESC controller may store in a memory corresponding to the ESC (e.g., in a memory within the ESC) the open loop flight control instructions received from the flight controller.

In determination block 512, each ESC controller may determine whether control signals from the flight controller have been lost. So long as control signals continue to be received from the flight controller (i.e., determination block 512="No"), each ESC controller continue to receive and store open loop flight control instructions from the flight controller or another processing device in block 708. In this manner, fresh open loop flight control instructions received and stored in memory periodically so that the ESCs are ready to respond to a loss of control signals event at all times.

In response to detecting a loss of control signals from the flight controller (i.e., determination block 512="Yes"), each ESC controller may access the stored open loop flight control instructions, and perform control of the motor associated with the ESC by executing the open loop flight control instructions in block 712. Thus, each ESC may execute the stored sequence of open loop flight control instructions as if the instructions were issued by the flight controller or another processing device. In some embodiments, the ESC controller may determine the open loop flight control instructions executed in block 712 based on parameterized information stored in memory that is accessed in block 710. In some embodiments, the ESC controller may determine the open loop flight control instructions executed in block 712 by performing other operations on the information stored in memory that is accessed in block 710, such as decompressing instructions that were stored in a compressed format. In some embodiments, each ESC may adjust a closed-loop control of the associated motor(s) based on the open loop flight control information. Once all stored open loop flight control instructions have been executed, the ESC may perform another operation, such as the depowering the motor.

Figure 8:
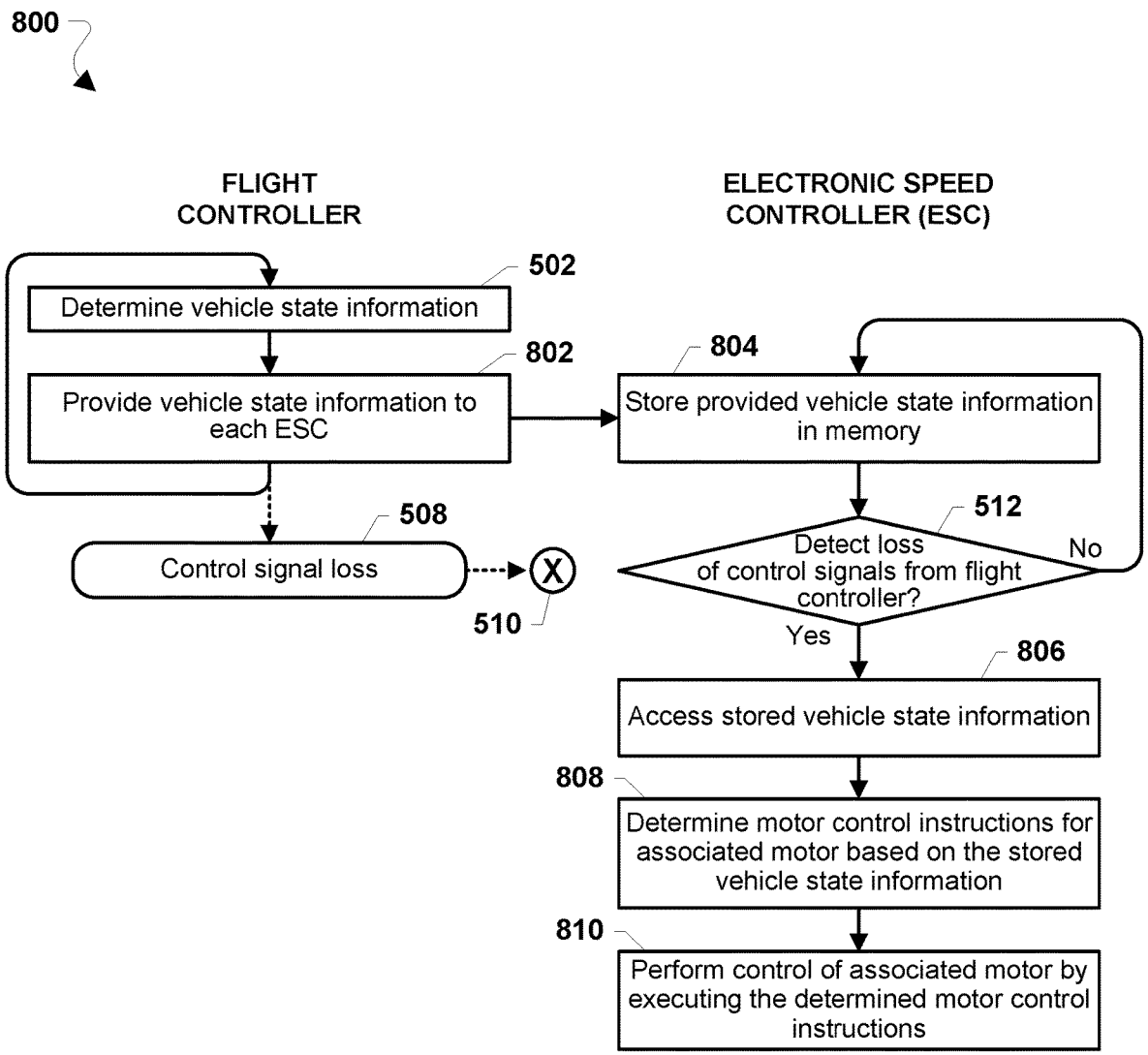
FIG. 8 is a process flow diagram illustrating a method of controlling a robotic vehicle according to some embodiments.

FIG. 8 illustrates a method 800 of controlling a robotic vehicle according to various embodiments. With reference to FIGS. 1-8, the method 800 may be implemented in hardware components and/or software components of the robotic vehicle (e.g., 102, 200, 400), the operation of which may be controlled by a flight controller (e.g., 220) or another processing device and ESC controllers (e.g., 408 and/or the like) of the robotic vehicle. In blocks 502-514, the flight controller or another processing device and the ESC controller, respectively, may perform operations of like-numbered blocks of the method 500 as described.

In block 802, the flight controller or another processing device may periodically provide vehicle state information to each ESC based on at least a subset of the vehicle information determined in block 502. For example, the flight controller or another processing device may provide each ESC with the current roll, pitch and yaw angles of the robotic vehicle, as well as airspeed and altitude information. The subset of vehicle state information provided to each ESC may be information that is particularly suitable for enabling each ESC controller to determine an appropriate response to a loss of control signals event. In some embodiments, such state information may include, for example, an altitude, pitch, velocity, current motor RPMs, and/or other similar state information.

In block 804, each ESC controller may store in memory the vehicle state information received from the flight controller or another processing device.

In determination block 512, each ESC controller may determine whether control signals from the flight controller have been lost. So long as control signals continue to be received from the flight controller (i.e., determination block 512="No"), each ESC controller continue to receive and store vehicle state information from the flight controller or another processing device in block 804. In this manner, fresh vehicle state information is received and stored in memory periodically so that the ESCs are equipped with current vehicle state information at all times to respond to a loss of control signals event.

In response to detecting a loss of control signals from the flight controller (i.e., determination block 512="Yes"), each ESC controller may access the stored vehicle state information in block 806.

In block 808, each ESC controller may determine appropriate motor control instructions for an associated motor for responding to the loss of control signals event based on the stored vehicle state information. In some embodiments, each ESC controller may determine a series of motor control instructions for its associated motor that, when independently executed by all of the ESCs, will cause the robotic vehicle to perform a maneuver that places the vehicle in a safer condition before all motors are turned off. The appropriate maneuver to be performed in response to a loss of control signals may depend upon the current vehicle attitude (e.g., pitch, roll and yaw), speed and altitude. In some embodiments, each ESC controller may apply an algorithm to the current vehicle state information to generate the appropriate series of motor control instructions. In some embodiments, each ESC controller may use the current vehicle state information in a table look up operation to obtain the appropriate series of motor control instructions from a database of instructions correlated to vehicle states.

In block 810, the ESC controller may perform open loop flight control of an associated motor or motors by executing the determined open loop flight control instructions. The number or duration of motor control instructions determined in block 808 and executing 810 may be sufficient to stabilize or otherwise place the robotic vehicle and a safer condition before all motors deenergized, such as stopping and/or leveling the vehicle or a brief period time (e.g., 1 to 2 seconds). In some embodiments, each ESC may adjust a closed-loop control of the associated motor(s) based on the open loop flight control information.

Figure 9:
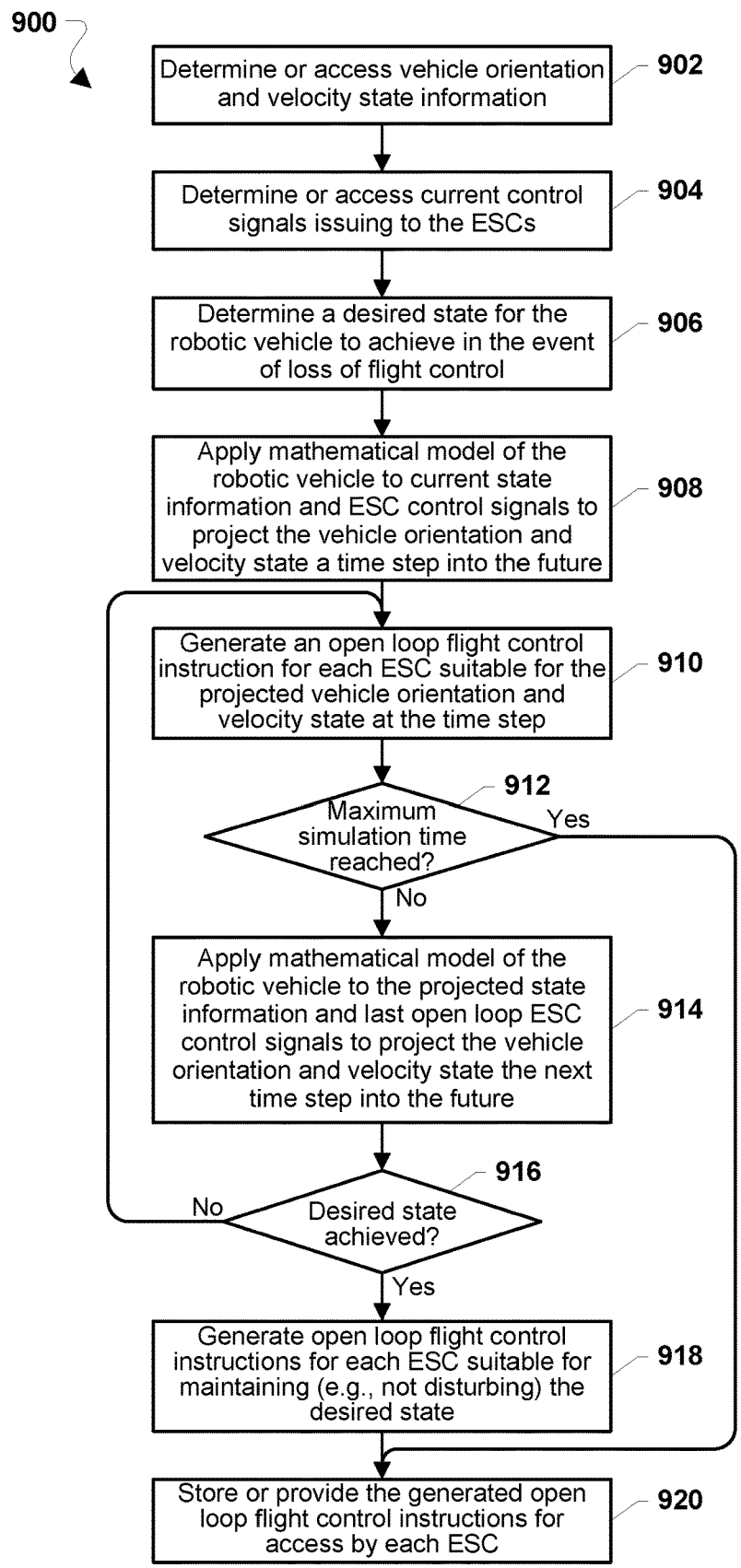
FIG. 9 is a process flow diagram illustrating an example method of generating open loop control information according to some embodiments.

FIG. 9 illustrates an example method 900 for generating open loop flight control information by the flight controller or another processing device according to some embodiments. With reference to FIGS. 1-9, the method 900 may be implemented by a processing device (e.g., 220) within a flight controller (e.g., 210) or by another processing device with access to vehicle state information (e.g., gyroscopes, accelerometers, etc.) For general applicability, the term "processing device" is used in the description of the method 900. The method 900 illustrates an example of operations that may be performed in blocks 604 of the method 600 and blocks 702 and 704 of the method 700.

In block 902, the processing device may determine or access vehicle orientation and vehicle state information. For example, a flight controller will have or have immediate access to the vehicle state information (e.g., horizontal and vertical velocities as well as pitch/roll/yaw rotational velocities) as part of the process of generating closed loop flight control instructions. As another example, a processing device performing the method 900 may access memory where vehicle state information is stored. As a further example, a processing device performing the method 900 may receive or access in memory the outputs of state sensors, including gyroscopes, accelerometers, etc. Determining or accessing vehicle orientation and vehicle state information enables the processor to determine the vehicle orientation and motions at the instance that the information is obtained.

In block 904, the processor may determine or access the current control signals that the flight controller is issuing to the ESCs. For example, if the flight controller is executing the method 900, such information is generated as the control signals are issued. As another example, a processing device performing the method 900 may receive or intercept control signals as they are issued to the ESCs or access a memory where control signals are temporarily stored. Determining or accessing the current control signals issuing to the ESCs provides information to the processor regarding the forces being applied to the vehicle by the rotors at the instance that the information is obtained, as well as forces that will be applied to the vehicle in the next instant as the control signals are implemented and the motors respond accordingly.

In block 906, the processor may determine a desired state for the robotic vehicle to achieve in the event of a loss of control signals. The desired state may be an orientation that will enable of the robotic vehicle to achieve a controlled landing or minimize damage to the robotic vehicle, such as upon striking the ground. The desired state of the robotic vehicle may depend upon the current orientation and velocity state of the vehicle, particularly in situations in which the vehicle is currently in a highly unstable configuration that may be difficult to control using open loop control information, is traveling too fast to be stopped using open loop control information, or is too high to achieve a controlled landing using open loop control information. In some embodiments, this may be because the duration that open loop flight control can be implemented is limited by the predictability of future vehicle states (e.g., 1-2 seconds). As an example, if the robotic vehicle is relatively low and in a near stable flight orientation, the processor may determine the desired state to be level flight with zero velocity and the rotors providing equalized lift (e.g., to avoid inducing role or pitch) that enables a controlled descent towards the ground within a matter of a few seconds. As another example, if the robotic vehicle is flying at a high altitude, the desired state may be level flight with zero velocity followed by turning the rotors off so that the robotic vehicle free falls in that configuration. As another example, if the robotic vehicle is flying in a highly unstable configuration, such as with a large pitch angle to maximize horizontal velocity, the processor may determine that the desired state is an orientation that will stop or minimize the horizontal velocity before the duration of open loop flight control ends so that the vehicle's velocity upon impact is reduced.

In block 908, the processor may apply a mathematical model of the robotic vehicle to the current state information in the current ESC control signals to project the vehicle orientation and velocity state a brief amount of time (referred to herein as a "time step") into the future. Said another way, the processor may use a mathematical model of the robotic vehicle to simulate the behavior of the robotic vehicle a brief time into the future. Such a mathematical model may calculate the orientation and velocity state of the robotic vehicle a few milliseconds into the future based upon the current orientation and current pitch, roll, yaw and translational velocities. Such a mathematical model may also calculate projected pitch, roll, yaw and translational velocities of the vehicle at the next time step based upon the accelerations applied to the vehicle in the six dimensions (i.e., X, Y, Z, pitch, roll, yaw) from air resistance on the structures of the vehicle and the forces on the vehicles generated by the rotors due to the current ESC control signals. Such calculations may be in the form of:

$$P(t+\Delta t)=P(t)+Vp(t)*\Delta t$$

$$Vp(t+\Delta t)=Ap*\Delta t$$

where P(t) is the position or orientation along a particular dimension at time increment t; Vp(t) is the velocity along the particular dimension at time increment t; Ap(t) is the acceleration along particular dimension at time increment t; and $\Delta t$ is time between each time increment (i.e., the duration of the simulation steps). The contribution to change in position orientation due to acceleration during the time between acceleration steps is ignored in this approximation, which is valid for short time increments. The accelerations about each dimension or degree of freedom may be calculated using well known equations of linear acceleration (e.g., F=MA) and angular acceleration (e.g., $\alpha=I/\tau$). In some embodiments, such equations of motion may be implemented in matrix format for the six degrees of freedom of the robotic vehicle, which may be processed by a processor optimized for vector operations, such as a graphics processing unit (GPU).

In block 910, the processor may use the projected orientation and velocity state of the robotic vehicle (i.e., the information generated in block 908) to generate an open loop flight control instruction for each ESC suitable for directing the robotic vehicle towards the desired state. In some embodiments, the open loop flight control instructions may be generated using the same or similar flight control rules as used in normal close loop flight control except that the orientation and velocity state information used in the rules is that generated by the mathematical model (i.e. by simulation) for the time step. The generated open loop flight control instruction may be one or a series of instructions suitable for a duration of the time steps used in simulating the future orientation and velocity of the vehicle. The open loop flight control instruction(s) generated in block 910 may be temporarily stored in a buffer or other memory.

In determination block 912, the processor may determine whether a maximum simulation time into the future over which open loop flight control is feasible has been reached. Again, open loop flight control is only feasible for a finite period of time (e.g., 1-2 seconds) before errors in initial state conditions and unpredictable forces render the control instructions inappropriate. Similar to predicting the weather, small errors in orientation (e.g., gyroscope errors) and acceleration measurements used as the initial conditions for the simulation, as well as unknown external forces, like wind, will lead to large effects in orientation and velocities after a sufficient time. Thus, controlling a robotic vehicle using open loop flight control information beyond the time that projecting robotic vehicle orientations and dynamics is feasible without gyroscope and accelerometer feedback could cause the robotic vehicle to enter a state that will result in more damage than if the motors were simply turned off. To account for this, the duration into the future that the processor may simulate vehicle orientations and generate open loop flight controls may be limited by determination block 912, such as to a matter of a few seconds.

In response to determining that the maximum simulation time into the future has not been reached (i.e., determination block 912="No"), the processor may apply the mathematical model of the robotic vehicle to the projected vehicle state information and the last open loop ESC control signals to project the vehicle orientation and velocity state, as well as accelerations, in the next time step into the future in block 914. Said another way, in block 914, processor continues the simulation of the robotic vehicle starting from the last projected orientation and velocity state (determined in block 908 or subsequently determined in block 914) and applying the last projected accelerations of the vehicle in the six dimensions (e.g., determined from the open loop flight control instruction determined in block 910 as applied to the rotors by the ESCs implementing the instruction). The projection of the vehicle orientation and velocity state information as well as updated accelerations may be calculated as described with reference to block 908.

In determination block 916, the processor may determine whether the projected orientation and velocity state determined in block 914 has achieved the desired state. Said another way, the processor may determine whether sufficient open loop control instructions have been assembled to enable the robotic vehicle to achieve the desired state when executed by the ESCs starting from the current orientation and velocity state as determined in block 902.

In response to determining that the projected vehicle state has not achieved the desired state (i.e., determination block 916="No"), the processor may again generate an open loop flight control instruction for each ESC suitable for the projected vehicle orientation and velocity state and accelerations in the simulation time step in block 910. Again, the open loop flight control instruction for each ESC may be generated for the time step so as to drive the robotic vehicle towards the desired state.

The operations in blocks 910 through 916 may continue in a simulation loop until either the desired state is achieved (determination block 916) or the maximum simulation time is reached (as determined in determination block 912).

In response to determining that the projected vehicle state has achieved the desired state (i.e., determination block 916="Yes"), the processor may generate open loop flight control instructions for each ESC suitable for maintaining the desired state while operating in an open loop manner. Said another way, the processor may generate open loop flight control instructions in block 918 configured to avoid disturbing the orientation of the vehicle once it achieves the desired state. For example, the flight control instructions may cause the ESCs to control the flight motors so that equal thrust and lift is applied, thus avoiding inducing a pitch or roll in the vehicle. As another example, the flight control instructions may cause the ESCs to stop powering the rotors so that the robotic vehicle can free fall without pitch or roll torque being applied by the rotors.

In response to determining that the maximum simulation time has been reached (i.e., determination block 912="Yes") or following generation of open loop flight controls instructions for maintaining the desired state in block 918, the processor may provision the generated open loop flight control instructions (or information implementing the instructions) in block 920 so that the information can be accessed by each ESC if needed. For example, the processor may send the generated open loop flight control information to each ESC in block 920 so that each ESC may store the information in local memory. As another example, in block 920 the processor may store the generated open loop flight control information in a memory or memories that each ESC can access in the event a loss of flight control signals occurs.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 500, 600, 700, and 800 may be substituted for or combined with one or more operations of the methods 500, 600, 700, and 800, and vice versa.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method for controlling a robotic vehicle having a flight controller and at least two electronic speed controllers (ESC) coupled to the same flight controller, comprising:
   receiving, by each ESC of the robotic vehicle, vehicle state information from the same flight controller;
   determining, by each ESC, motor control instructions of a motor associated with each ESC based on the received vehicle state information in response to detecting a loss of control signals from the flight controller; and
   executing, by each ESC, the determined motor control instructions to control the associated motor.

2. The method of claim 1, further comprising periodically receiving, from the flight controller, the vehicle state information by each ESC.

3. The method of claim 1, wherein the received vehicle state information comprises one or more of attitude, velocity, and altitude of the robotic vehicle.

4. The method of claim 1, wherein determining, by each ESC, the motor control instructions comprises obtaining a series of motor control instructions from a database of instructions correlated to the received vehicle state information.

5. The method of claim 1, wherein the flight controller comprises an inertial measurement unit configured to provide the state information to the ES Cs.

6. A robotic vehicle, comprising:
   a memory;
   a flight controller; and
   at least two electronic speed controllers (ESC) coupled to the memory and the flight controller and configured to control a respective motor, wherein each ESC is configured to:
      receive vehicle state information from the flight controller;
      determine motor control instructions of the respective motor based on the received vehicle state information in response to detecting a loss of control signals from the flight controller; and
      execute the determined motor control instructions to control the respective motor.

7. The robotic vehicle of claim 6, wherein each ESC is configured to periodically receive vehicle state information from the flight controller.

8. The robotic vehicle of claim 6, wherein the received vehicle state information comprises one or more of attitude, velocity, and altitude of the robotic vehicle.

9. The robotic vehicle of claim 6, wherein the motor control instructions are obtained from a database of instructions correlated to the received vehicle state information.

10. The robotic vehicle of claim 6, wherein the flight controller comprises an inertial measurement unit configured to provide the state information to the ESCs.

* * * * *